(12) United States Patent
Palanki et al.

(10) Patent No.: US 8,365,047 B2
(45) Date of Patent: *Jan. 29, 2013

(54) FEC CODE AND CODE RATE SELECTION BASED ON PACKET SIZE

(75) Inventors: Ravi Palanki, San Diego, CA (US); Jeremy H. Lin, San Diego, CA (US); Aamod Khandekar, San Diego, CA (US); Alexei Gorokhov, San Diego, CA (US); Avneesh Agrawal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,999

(22) Filed: Dec. 20, 2011

(65) Prior Publication Data

US 2012/0089890 A1 Apr. 12, 2012

Related U.S. Application Data

(62) Division of application No. 11/943,172, filed on Nov. 20, 2007.

(60) Provisional application No. 60/883,715, filed on Jan. 5, 2007.

(51) Int. Cl.
*H03M 13/00* (2006.01)

(52) U.S. Cl. ...................................................... 714/776

(58) Field of Classification Search .................. None
See application file for complete search history.

(56) References Cited

U.S. PATENT DOCUMENTS

| | | | |
|---|---|---|---|
| 5,533,004 | A | 7/1996 | Jasper et al. |
| 5,822,318 | A | 10/1998 | Tiedemann, Jr. et al. |
| 6,049,537 | A | 4/2000 | Proctor et al. |
| 6,262,994 | B1 | 7/2001 | Dirschedl et al. |
| 7,181,657 | B2 | 2/2007 | Soga et al. |
| 7,227,874 | B2 | 6/2007 | Kim et al. |
| 7,366,132 | B2 | 4/2008 | Ramakrishnan et al. |
| 7,369,527 | B2 | 5/2008 | Heo et al. |

(Continued)

FOREIGN PATENT DOCUMENTS

| | | |
|---|---|---|
| CN | 1356795 A | 7/2002 |
| EP | 1372304 A2 | 12/2003 |

(Continued)

OTHER PUBLICATIONS

3GPP TS 25.211 V5.8.0, "Physical channels and mapping of transport channels onto physical channels", Dec. 2005.

(Continued)

*Primary Examiner* — Guerrier Merant
(74) *Attorney, Agent, or Firm* — Sayed Hossain Bealdi

(57) ABSTRACT

Techniques for encoding and decoding data are described. In an aspect, multiple code rates for a forward error correction (FEC) code may be supported, and a suitable code rate may be selected based on packet size. A transmitter may obtain at least one threshold to use for code rate selection, determine a packet size to use for data transmission, and select a code rate from among the multiple code rates based on the packet size and the at least one threshold. In another aspect, multiple FEC codes of different types (e.g., Turbo, LDPC, and convolutional codes) may be supported, and a suitable FEC code may be selected based on packet size. The transmitter may obtain at least one threshold to use for FEC code selection and may select an FEC code from among the multiple FEC codes based on the packet size and the at least one threshold.

35 Claims, 12 Drawing Sheets

U.S. PATENT DOCUMENTS

| | | |
|---|---|---|
| 7,437,654 B2 | 10/2008 | Das et al. |
| 2003/0039218 A1 | 2/2003 | Kwak |
| 2006/0067256 A1 | 3/2006 | Alazraki et al. |
| 2006/0179387 A1 | 8/2006 | Taffin et al. |
| 2006/0218459 A1 | 9/2006 | Hedberg |
| 2008/0168332 A1 | 7/2008 | Palanki et al. |
| 2009/0265600 A1 | 10/2009 | Matsumoto et al. |

FOREIGN PATENT DOCUMENTS

| | | |
|---|---|---|
| EP | 1513282 A2 | 3/2005 |
| JP | 11215098 A | 8/1999 |
| JP | 2004282197 A | 10/2004 |
| JP | 2005117579 A | 4/2005 |
| JP | 2006019782 A | 1/2006 |
| JP | 2006229693 A | 8/2006 |
| KR | 1020020067918 | 8/2002 |
| RU | 94015375 | 4/1996 |
| WO | WO0141313 A1 | 6/2001 |
| WO | WO2006069270 A1 | 6/2006 |

OTHER PUBLICATIONS

3GPP TS 25.212 V5.10.0, "Multiplexing and channel coding", Jun. 2005.

3GPP2 TS 25.214: "Physical layer procedures (FDD)", Release 5, V5.11.0, Jun. 2005.

International Search Report—PCT/US08/050316—International Search Authority, European Patent Office—Jul. 3, 2008.

TIA-1121.001 "Physical Layer for Ultra Mobile Broadband (UMB) Air Interface Specification," 3GPP2 C.S0084-001-0, Version 2.0 (Aug. 2007).

Written Opinion—PCT/US08/050316—International Search Authority, European Patent Office—Jul. 13, 2008.

European Search Report—EP12000583—Search Authority—The Hague—Apr. 20, 3012.

Nortel Networks, "Channel Coding for the Low Bit Rates", 3GPP TSF RAN WG1 Meeting #4, R1-99465, Mar. 25-29, 1999.

Taiwan Search Report—TW097100642—TIPO—Apr. 3, 2012.

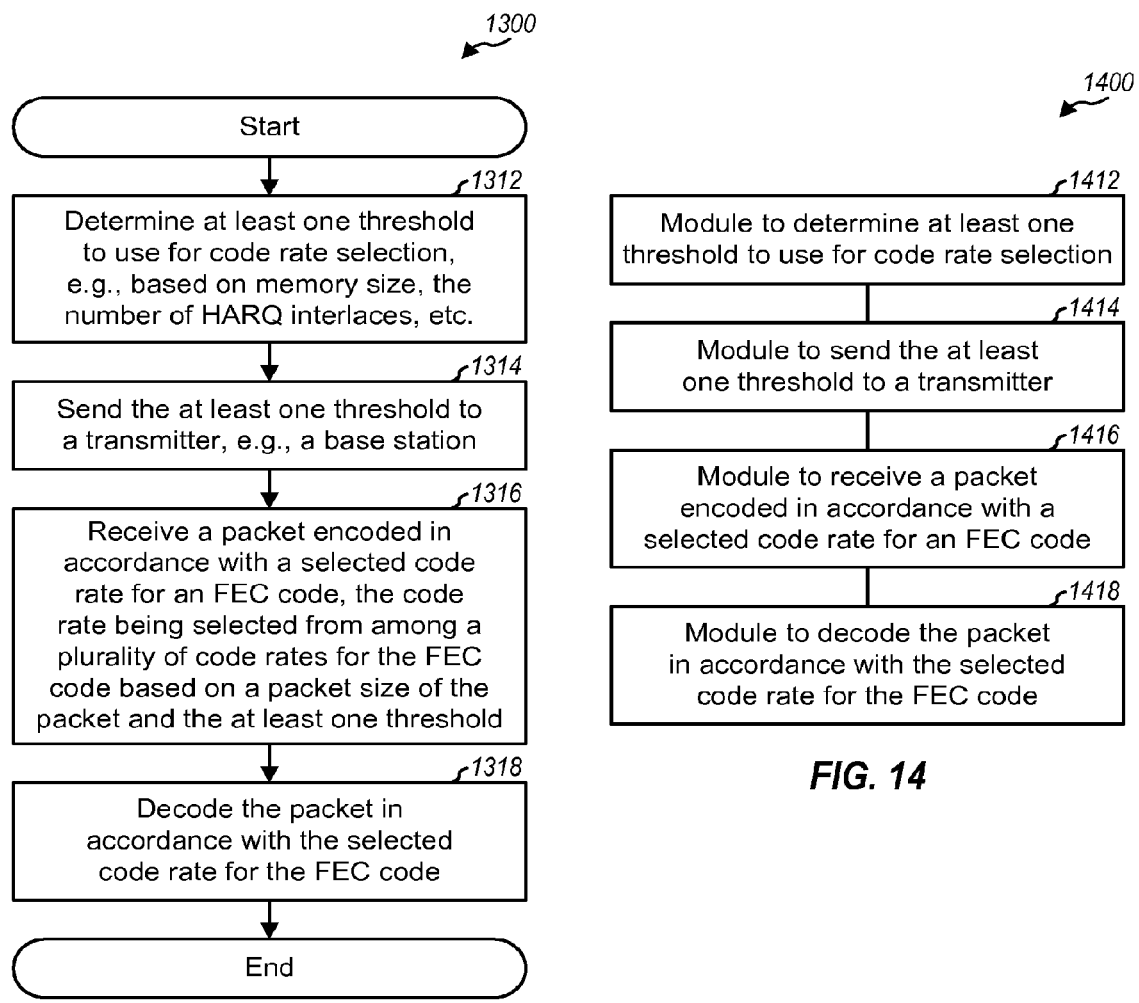

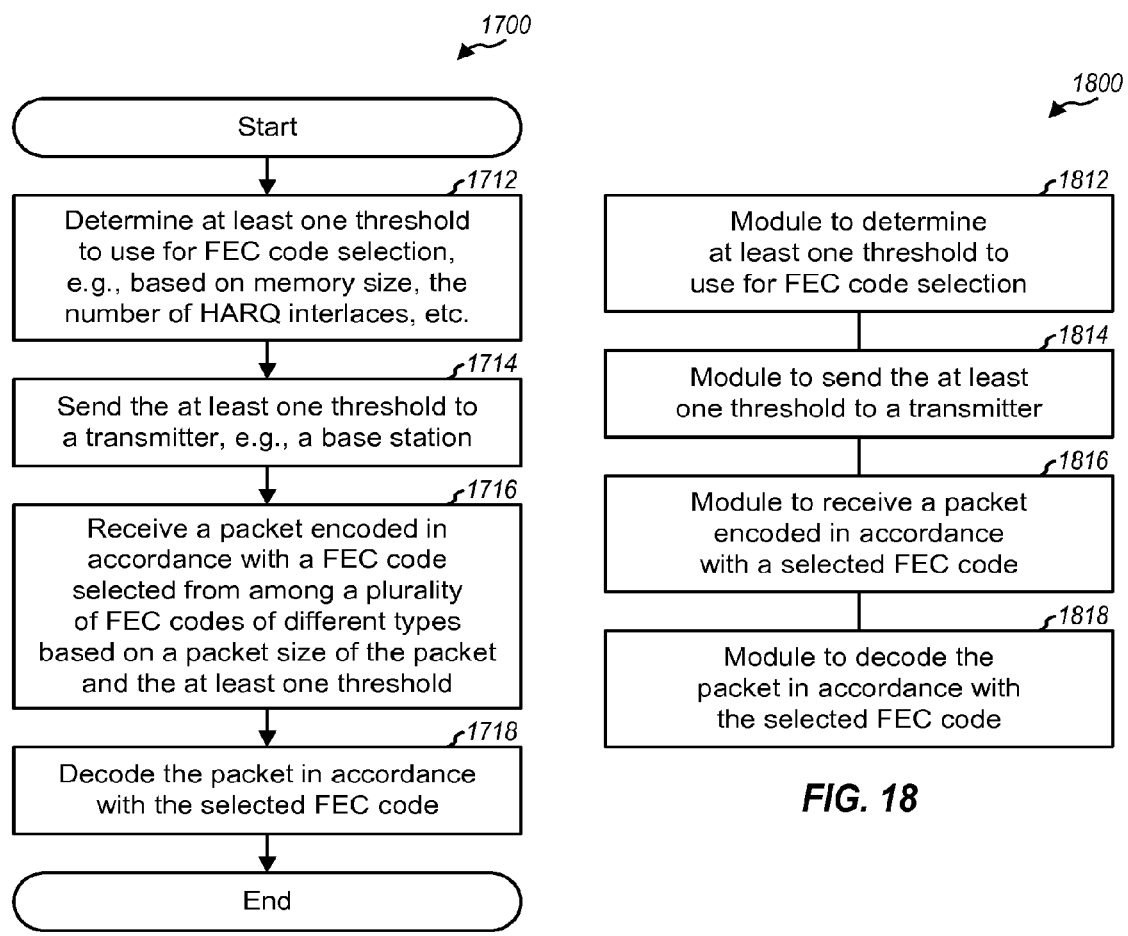

FEC CODE AND CODE RATE SELECTION BASED ON PACKET SIZE

The present Application for Patent is a divisional of U.S. patent application Ser. No. 11/943,172 entitled "FEC CODE AND CODE RATE SELECTION BASED ON PACKET SIZE" filed Nov. 20, 2007, pending and claims priority to provisional U.S. application Ser. No. 60/883,715, entitled "OPTIONAL RATE-⅓ CODE BASED ON AT CAPABILITY," filed Jan. 5, 2007, assigned to the assignee hereof and incorporated herein by reference.

BACKGROUND

I. Field

The present disclosure relates generally to communication, and more specifically to techniques for encoding and decoding data.

II. Background

In a communication system, a transmitter may encode a packet of data to obtain code bits, interleave or reorder the code bits, and map the interleaved bits to modulation symbols. The transmitter may then process and transmit the modulation symbols via a communication channel. The communication channel may distort the data transmission with a particular channel response and further degrade the data transmission with noise and interference. A receiver may obtain received symbols, which may be distorted and degraded versions of the transmitted modulation symbols, and may process the received symbols to recover the transmitted packet.

Encoding by the transmitter may allow the receiver to reliably recover the transmitted packet based on the degraded received symbols. The transmitter may perform encoding based on a forward error correction (FEC) code that generates redundancy in the code bits. The amount of redundancy is determined by a code rate of the FEC code. Too little redundancy may result in the receiver being unable to decode the packet. Conversely, too much redundancy may result in under-utilization of the capacity of the communication channel and/or other adverse effects.

There is therefore a need in the art for techniques to efficiently encode and decode data.

SUMMARY

Techniques for efficiently encoding and decoding data are described herein. In an aspect, multiple code rates for an FEC code may be supported, and a suitable code rate may be selected based on packet size. In general, higher code rates may be used for larger packet sizes, and lower code rates may be used for smaller packet sizes. This may improve decoding performance for a receiver with a limited size memory.

In one design, a transmitter (e.g., a base station) may obtain at least one threshold to use for code rate selection (e.g., from a receiver such as a terminal). The transmitter may determine a packet size to use for data transmission. The transmitter may then select a code rate from among multiple code rates for an FEC code based on the packet size and the at least one threshold. The FEC code may be a Turbo code, a low density parity check (LDPC) code, a convolutional code, or some other code. The transmitter may encode a packet in accordance with a base code rate for the FEC code to obtain a coded packet and may puncture the coded packet, if needed, to obtain the selected code rate for the packet. The transmitter may then transmit the coded packet, after any puncturing, to the receiver.

In another aspect, multiple FEC codes of different types may be supported, and a suitable FEC code may be selected based on packet size. In one design, a transmitter may obtain at least one threshold to use for FEC code selection and may determine a packet size to use for data transmission. The transmitter may then select an FEC code from among multiple FEC codes of different types based on the packet size and the at least one threshold. The transmitter may encode a packet in accordance with the selected FEC code to obtain a coded packet and may further process and transmit the coded packet.

A receiver may perform the complementary processing to recover a packet sent by a transmitter. Various aspects and features of the disclosure are described in further detail below.

BRIEF DESCRIPTION OF THE DRAWINGS

FIGS. 13 and 14 show a process and an apparatus, respectively, for receiving data with code rate selection based on packet size.
FIGS. 17 and 18 show a process and an apparatus, respectively, for receiving data with FEC code selection based on packet size.

DETAILED DESCRIPTION

The techniques described herein may be used for various wireless communication systems and networks. The terms "system" and "network" are often used interchangeably. For example, the techniques may be used for wireline communication systems, wireless communication systems, wireless local area networks (WLANs), etc. The wireless communication systems may be Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," August 2007, which is publicly available.

Figure 1:
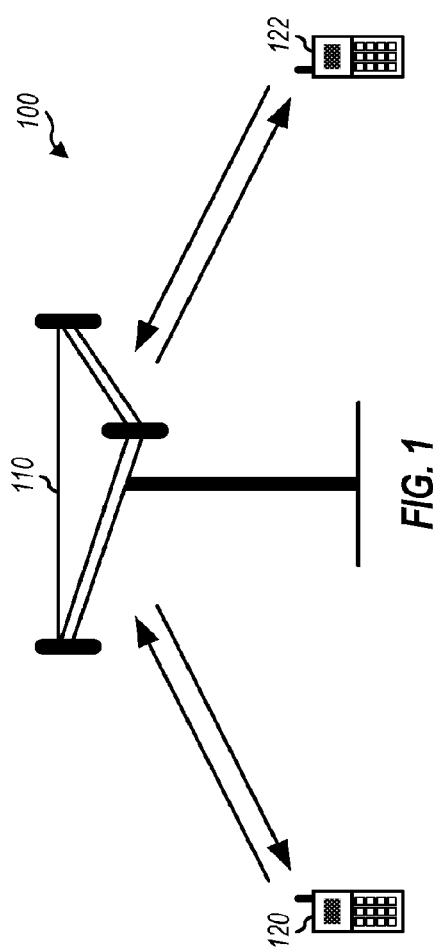
FIG. 1 shows a wireless communication system.

FIG. 1 shows a wireless communication system 100, which may also be referred to as an access network (AN). For simplicity, only one base station 110 and two terminals 120 and 122 are shown in FIG. 1. A base station is a station that communicates with the terminals. A base station may also be referred to as an access point, a Node B, an evolved Node B, etc. A terminal may be stationary or mobile and may also be referred to as an access terminal (AT), a mobile station, a user equipment, a subscriber unit, a station, etc. A terminal may be a cellular phone, a personal digital assistant (PDA), a wireless communication device, a wireless modem, a handheld device, a laptop computer, a cordless phone, etc. A terminal may communicate with one or more base stations on the forward and/or reverse links at any given moment. The forward link (or downlink) refers to the communication link from the base stations to the terminals, and the reverse link (or uplink) refers to the communication link from the terminals to the base stations.

The system may support hybrid automatic retransmission (HARQ). For HARQ, a transmitter may send one or more transmissions for a packet until the packet is decoded correctly by a receiver, or the maximum number of transmissions has been sent, or some other termination condition is encountered. HARQ may improve reliability of data transmission.

Figure 2:
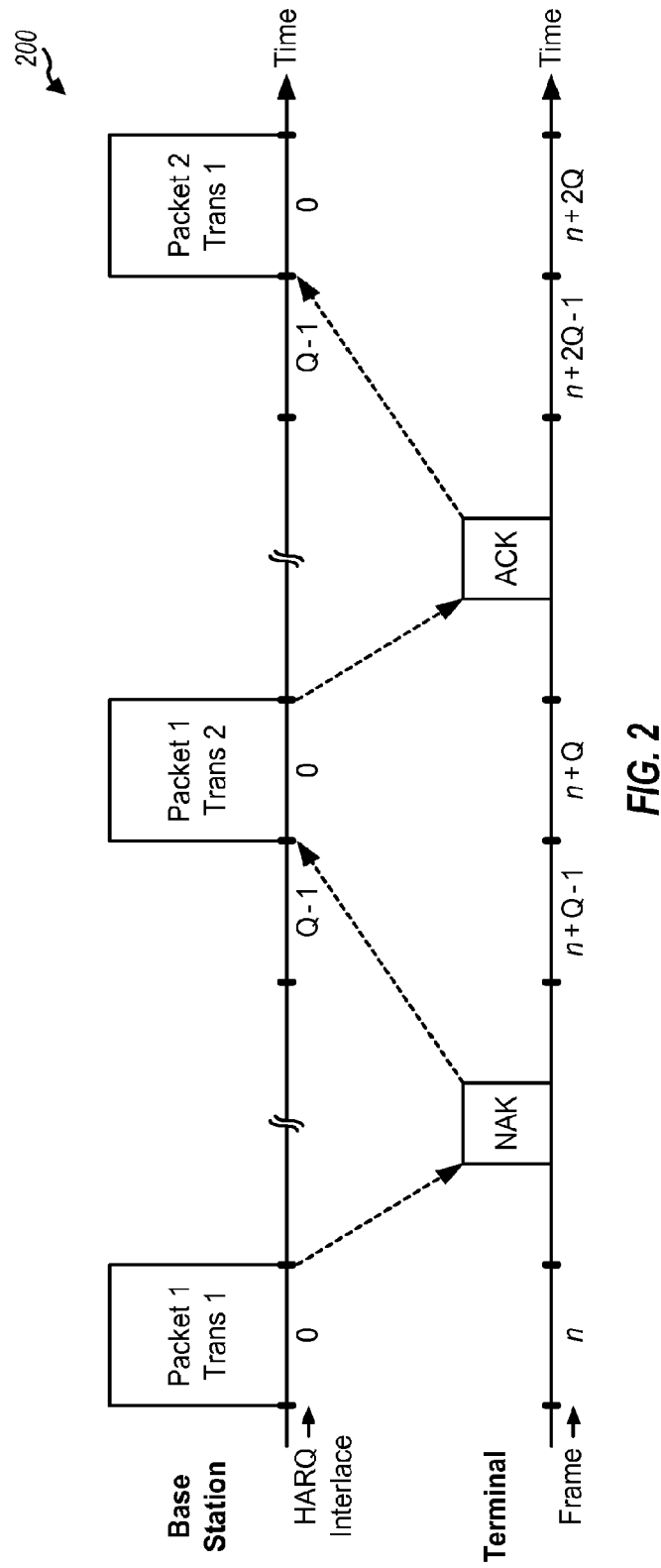
FIG. 2 shows data transmission with HARQ.

FIG. 2 shows data transmission on the forward link with HARQ. The transmission timeline may be partitioned into frames, with each frame having a particular time duration. Multiple (Q) HARQ interlaces may be defined, where Q may be a fixed or configurable value. For example, Q may be equal to 4, 6, 8, etc. Each HARQ interlace may include frames that are spaced apart by Q frames. Thus, HARQ interlace q may include frames n+q, n+Q+q, n+2Q+q, etc., for q∈{0, . . . , Q−1}.

Up to Q packets may be sent in parallel on the Q HARQ interlaces, one packet per HARQ interlace. One or more HARQ transmissions may be sent for each packet on the HARQ interlace used for that packet. An HARQ transmission is a transmission for one packet in one frame. A packet may be processed (e.g., encoded and modulated) and sent such that it can be decoded correctly with a target number of HARQ transmissions, which may be 2, 3, 4, etc.

For data transmission on the forward link, terminal 120 may periodically estimate the forward link channel quality and send channel quality indicator (CQI) to base station 110. Base station 110 may use the CQI and/or other information to select a packet format to use for each HARQ transmission to terminal 120. A packet format may be associated with a packet size, a spectral efficiency, a code rate, a modulation order or scheme, and/or other parameters for a packet or a transmission. Base station 110 may process a packet (Packet 1) based on the selected packet format and send the first HARQ transmission (Trans 1) on HARQ interlace 0. Terminal 120 may receive the first HARQ transmission, decode Packet 1 in error, and send a negative acknowledgment (NAK). Base station 110 may receive the NAK and send a second HARQ transmission (Trans 2) for Packet 1 on the same HARQ interlace 0. Terminal 120 may receive the second HARQ transmission, decode Packet 1 correctly based on the first and second HARQ transmissions, and send an acknowledgement (ACK). Base station 110 may receive the ACK and process and send another packet (Packet 2) on HARQ interlace 0 in similar manner.

For simplicity, FIG. 2 shows data transmission on one HARQ interlace to terminal 120. Base station 110 may transmit up to Q packets in parallel on up to Q HARQ interlaces to terminal 120. These packets may start and end at different times.

Figure 3:
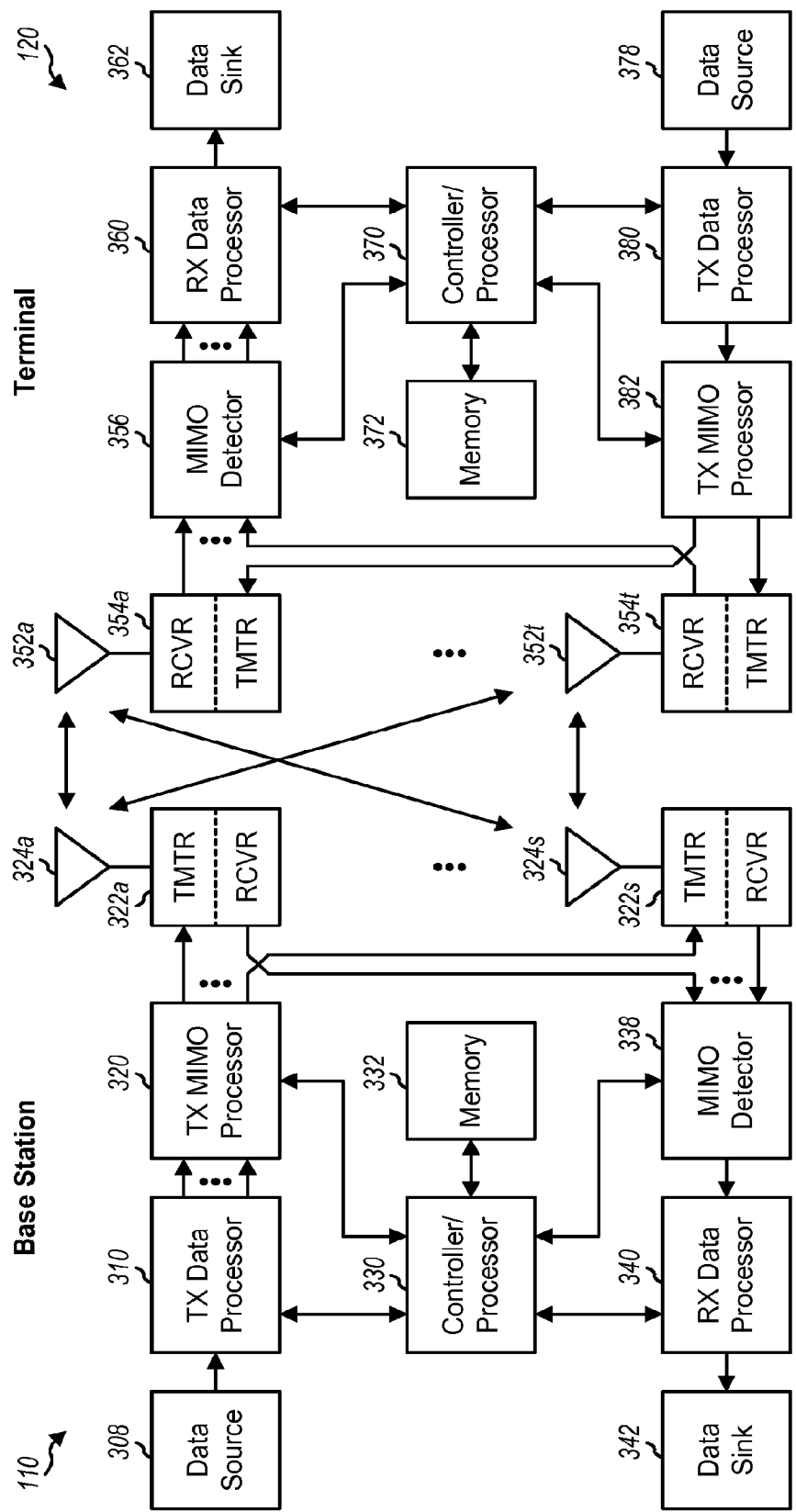
FIG. 3 shows a block diagram of a base station and a terminal.

FIG. 3 shows a block diagram of a design of base station 110 and terminal 120 in FIG. 1. In this design, base station 110 is equipped with S antennas 324a through 324s, and terminal 120 is equipped with T antennas 352a through 352t, where in general S≧1 and T≧1.

On the forward link, at base station 110, a TX data processor 310 may receive a packet of data for terminal 120 from a data source 308, process (e.g., encode, interleave, and symbol map) the packet based on a packet format, and provide data symbols, which are modulation symbols for data. A TX MIMO processor 320 may multiplex the data symbols with pilot symbols, perform direct MIMO mapping or precoding/beamforming if applicable, and provide S output symbol streams to S transmitters (TMTR) 322a through 322s. Each transmitter 322 may process its output symbol stream (e.g., for OFDM) to obtain an output chip stream. Each transmitter 322 may further condition (e.g., convert to analog, filter, amplify, and upconvert) its output chip stream and generate a forward link signal. S forward link signals from transmitters 322a through 322s may be transmitted from S antennas 324a through 324s, respectively.

At terminal 120, T antennas 352a through 352t may receive the forward link signals from base station 110, and each antenna 352 may provide a received signal to a respective receiver (RCVR) 354. Each receiver 354 may process (e.g., filter, amplify, downconvert, and digitize) its received signal to obtain samples, further process the samples (e.g., for OFDM) to obtain received symbols, and provide the received symbols to a MIMO detector 356. MIMO detector 356 may perform MIMO detection on the received symbols, if applicable, and provide detected symbols. An RX data processor 360 may further process (e.g., symbol demap, deinterleave, and decode) the detected symbols and provide decoded data to a data sink 362. In general, the processing by MIMO detector 356 and RX data processor 360 is complementary to the processing by TX MIMO processor 320 and TX data processor 310 at base station 110.

On the reverse link, at terminal 110, a packet of data may be provided by data source 378 and processed (e.g., encoded, interleaved, and symbol mapped) by a TX data processor 380. The data symbols from TX data processor 380 may be multiplexed with pilot symbols and spatially processed by a TX MIMO processor 382, and further processed by transmitters 354a through 354t to obtain T reverse link signals, which may be transmitted via antennas 352a through 352t. At base station 110, the reverse link signals from terminal 120 may be received by antennas 324a through 324s, processed by receivers 322a through 322s, detected by a MIMO detector 338, and further processed by an RX data processor 340 to recover the packet sent by terminal 120.

Controllers/processors 330 and 370 may direct the operation at base station 110 and terminal 120, respectively. Controllers/processors 330 and/or 370 may also perform code rate selection and/or FEC code selection for data transmission on the forward and reverse links, as described below. Memories 332 and 372 may store data and program codes for base station 110 and terminal 120, respectively.

The techniques described herein may be used for data transmission on the forward link as well as the reverse link. For clarity, certain aspects are described below for data transmission on the forward link.

Figure 4:
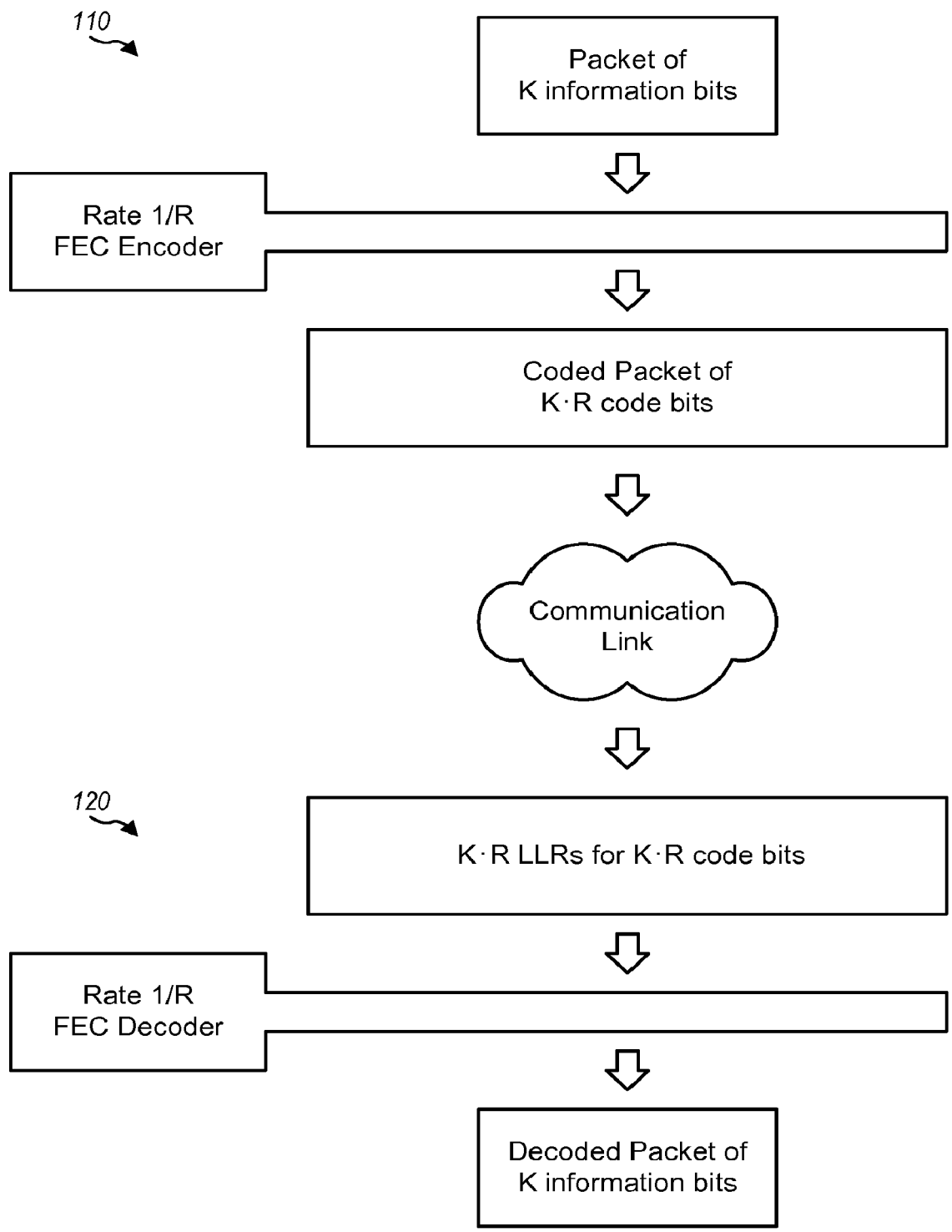
FIG. 4 shows encoding and decoding for data transmission.

FIG. 4 shows encoding and decoding for data transmission on the forward link. At base station 110, a packet of K information bits may be encoded by a rate 1/R FEC encoder to generate a coded packet of approximately K·R code bits. The code bits may be mapped to modulation symbols, which may be further processed and transmitted via a communication link. At terminal 120, the transmission received via the communication link may be processed to obtain detected symbols, which may be further processed to obtain up to K·R log-likelihood ratios (LLRs) for up to K·R code bits received for the packet. A modulation symbol may be obtained by mapping B code bits to a complex value in a signal constellation, where $B \geq 1$. B LLRs may be computed for the B code bits of the modulation symbol based on a corresponding detected symbol. The LLR for each code bit may indicate the likelihood of that code bit being zero ('0') or one ('1') given the detected symbol for the code bit. A rate 1/R FEC decoder may decode the LLRs to obtain a decoded packet of K information bits.

If HARQ is used for data transmission, then a fraction of the K·R code bits for the packet may be sent in each HARQ transmission. If all K·R code bits have been sent and the packet is still not decoded correctly, then some or all of the same code bits may be resent in subsequent HARQ transmissions. The LLRs for code bits that are resent in a later HARQ transmission may be combined with the LLRs for the same code bits received in a prior HARQ transmission.

In general, better decoding performance may be obtained by using a lower code rate so that different code bits are sent for the packet. However, a lower code rate may also result in storage of more LLRs. Conversely, a higher code rate may provide fewer code bits and hence result in storage of fewer LLRs. However, a higher code rate may result in worse decoding performance. A suitable code rate may be selected based on a tradeoff between memory requirement and decoding performance.

The packet size of a packet may be selected in various manners. In one design, the packet size may be selected as follows:

$$\text{Packet size} = \text{HARQ}_{target} * \text{SE}_{target} * N_{resources}, \quad \text{Eq (1)}$$

where $\text{HARQ}_{target}$ is the target number of HARQ transmissions for the packet, $\text{SE}_{target}$ is a target spectral efficiency for the packet, and $N_{resources}$ is the amount of physical resources used to send the packet.

The target spectral efficiency may be selected based on the reported CQI, e.g., higher target spectral efficiency for higher CQI. The packet size may also be selected based on other sets of parameters.

Terminal 120 may compute LLRs for code bits as data symbols for the packet are received and may temporarily store the LLRs in a buffer memory. The memory may have a fixed size and may be able to store up to M LLRs. The memory size M may be any value and may be dependent on the terminal capability. The relationship between packet size, code rate, and memory size may be expressed as:

$$\frac{\text{Packet size}}{\text{Code rate}} \leq \text{Memory size}. \quad \text{Eq (2)}$$

As shown in equation (2), for a given memory size M, there is a tradeoff between packet size K and code rate 1/R. For example, a memory capable of storing 10,000 LLRs may support a packet size of 2000 information bit with a code rate of ⅕, a packet size of 3333 with a code rate of ⅓, a packet size of 5000 with a code rate of ½, a packet size of 6666 with a code rate of ⅔, etc.

Equation (2) assumes that a single packet is sent and that the memory only stores LLRs for this packet. As described above for FIG. 2, up to Q packets may be sent in parallel on up to Q different HARQ interlaces. In this case, the memory may be partitioned into up to Q sections, with each section storing LLRs for one packet. The relationship between packet size, code rate, number of HARQ interlaces, and memory size may then be expressed as:

$$\frac{\text{Packet size}}{\text{Code rate}} * \text{Number of } HARQ \text{ interlaces} \leq \text{Memory size}. \quad \text{Eq (3)}$$

The number of HARQ interlaces in equation (3) may be the number of HARQ interlaces (Q) available for data transmission, the number of HARQ interlaces used for data transmission, etc.

In an aspect, different code rates of an FEC code may be used for data transmission depending on packet size. In general, higher code rates may be used for larger packet sizes, and lower code rates may be used for smaller packet sizes.

Figure 5:
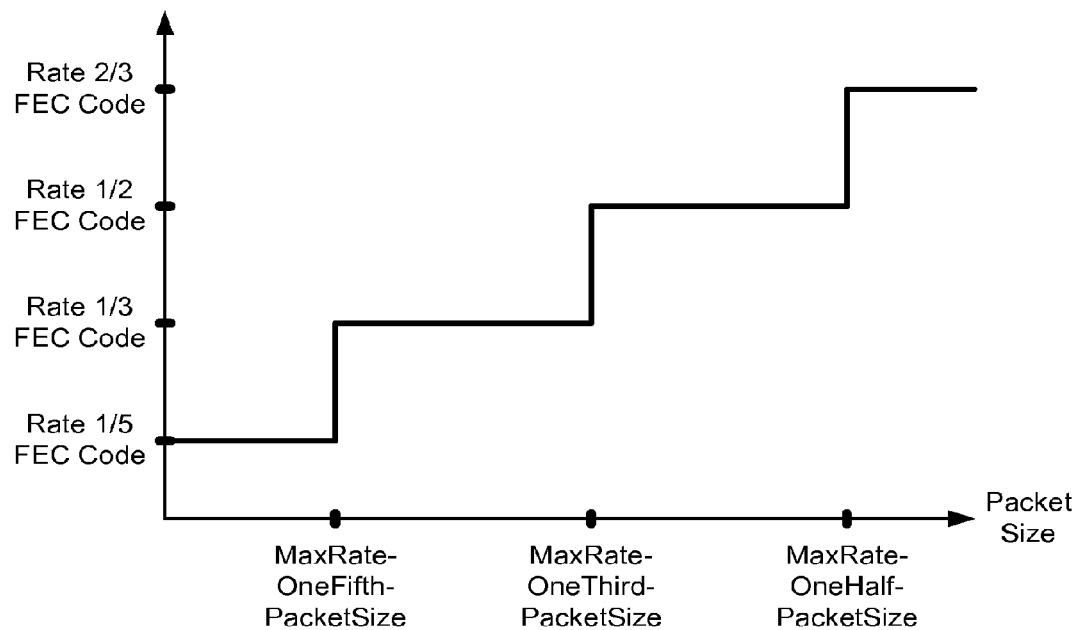
FIG. 5 shows a plot of code rate versus packet size.

FIG. 5 shows a plot of code rate versus packet size in accordance with one design. In this design, four FEC code rates of ⅕, ⅓, ½ and ⅔ are supported. Rate ⅕ FEC code is selected if the packet size is equal to or less than a first threshold MaxRateOneFifthPacketSize. Rate ⅓ FEC code is selected if the packet size is greater than MaxRateOneFifthPacketSize and equal to or less than a second threshold MaxRateOneThirdPacketSize. Rate ½ FEC code is selected if the packet size is greater than MaxRateOneThirdPacketSize and equal to or less than a third threshold MaxRateOneHalfPacketSize. Rate ⅔ FEC code is selected if the packet size is greater than MaxRateOneHalfPacketSize. Table 1 summarizes the code rate selection for the design shown in FIG. 5.

TABLE 1

| FEC Code | Code Rate Selection Criterion |
| --- | --- |
| Rate 1/5 | Packet size ≤ MaxRateOneFifthPacketSize |
| Rate 1/3 | MaxRateOneFifthPacketSize < Packet size ≤ MaxRateOneThirdPacketSize |
| Rate 1/2 | MaxRateOneThirdPacketSize < Packet size ≤ MaxRateOneHalfPacketSize |
| Rate 2/3 | MaxRateOneHalfPacketSize < Packet size |

If multiple HARQ interlaces can be used for data transmission, then the thresholds in Table 1 may be set based on the number of HARQ interlaces. In one design, the thresholds may be set as follows:

If Q=8 HARQ interlaces are available for use, then
  MaxRateOneFifthPacketSize=
    MaxRateOneFifthPacketSizeEightInterlace,
  MaxRateOneThirdPacketSize=
    MaxRateOneThirdPacketSizeEightInterlace, and
  MaxRateOneHalfPacketSize=
    MaxRateOneHalfPacketSizeEightInterlace.
If Q=6 HARQ interlaces are available for use, then
  MaxRateOneFifthPacketSize=
    MaxRateOneFifthPacketSizeSixInterlace,
  MaxRateOneThirdPacketSize=
    MaxRateOneThirdPacketSizeSixInterlace, and
  MaxRateOneHalfPacketSize=
    MaxRateOneHalfPacketSizeSixInterlace.

The number of HARQ interlaces may be configurable and set by the system. MaxRateOneFifthPacketSizeEightInterlace, MaxRateOneThirdPacketSizeEightInterlace, MaxRateOneHalfPacketSizeEightInterlace, MaxRateOneFifthPacketSizeSixInterlace, MaxRateOneThirdPacketSizeSixInterlace, and MaxRateOneHalfPacketSizeSixInterlace may be configurable attributes. Terminal 120 may determine the values of these configurable attributes based on its memory size, the number of HARQ interlaces, and/or other parameters. In one design, the thresholds for code rate selection may be determined as follows:

$$\text{Threshold}(r) = \frac{\beta * \text{Memory size} * \text{Code rate}(r)}{\text{Number of HARQ interlaces}}, \quad \text{Eq (4)}$$

where code rate (r) may be equal to ⅕, ½, ⅓, or ⅔,
 β is a value less than 1.0 and used to provide a margin, and
 threshold(r) is a threshold for code rate (r) for a given number of HARQ interlace.

In one design, terminal 120 may determine the thresholds for all code rates supported for the FEC code, e.g., as shown in equation (4). Threshold(r) may correspond to the MaxRate parameters given above for different numbers of HARQ interlaces. Terminal 120 may send the thresholds or attribute values as its capability to the system. In another design, terminal 120 may send capability information (e.g., its memory size) to the system. The system may then determine the thresholds for terminal 120 based on the capability information. In any case, the system may thereafter send data to terminal 120 in accordance with code rates selected based on these thresholds.

In general, the FEC code shown in FIG. 5 may be any type of FEC code. For example, the FEC code may be a Turbo code, a convolutional code, a LDPC code, a block code, or some other type of code.

The system may also support different types of FEC codes. In one design, the system may support a Turbo code, a convolutional code, and a LDPC code. These different types of FEC codes may have different characteristics and performance.

In another aspect, a suitable FEC code may be selected for use based on packet size. The Turbo code may provide better decoding performance for larger packets whereas the convolutional code may provide better decoding performance for smaller packets.

Figure 6:
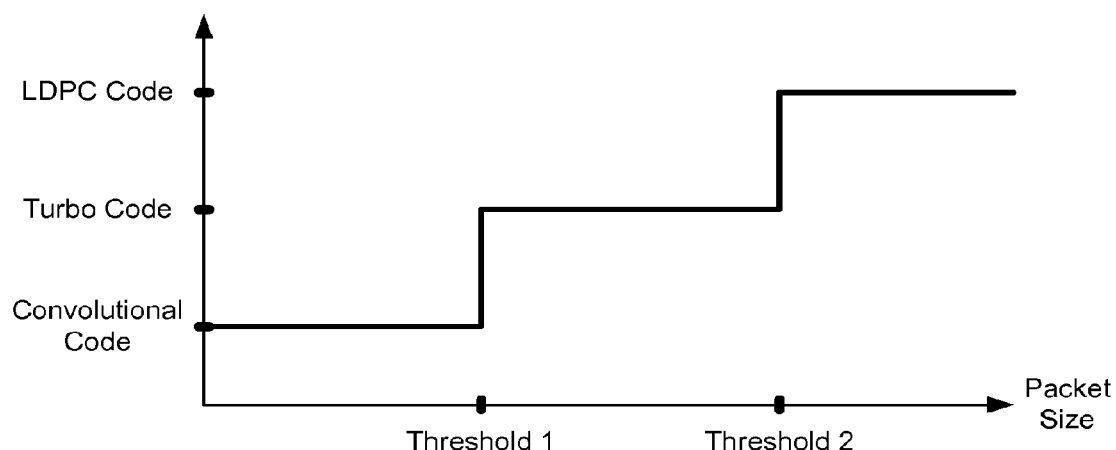
FIG. 6 shows a plot of FEC code versus packet size.

FIG. 6 shows a plot of FEC code versus packet size in accordance with one design. In this design, the convolutional code is selected for use if the packet size is less than or equal to a first threshold. The Turbo code is selected for use if the packet size is greater than the first threshold and less than or equal to a second threshold. The LDPC code is selected for use if the packet size is greater than the second threshold. In general, the first and second thresholds may each be a fixed or configurable value. In one design, the first threshold is a fixed value, which may be 128 bits or some other value. In one design, the second threshold is a configurable value that may be determined by terminal 120 and sent as its capability to the system.

In general, the system may support any combination of FEC codes of different types and any type of FEC code. Furthermore, the system may support any number of code rates and any code rate for each FEC code. For each FEC code with multiple code rates, a set of thresholds may be determined based on various factors such as the memory size of the receiver, the number of HARQ interlaces available for use, the number of HARQ interlaces used for data transmission, the number of packets to send in parallel, the target number of HARQ transmissions, decoding speed of the receiver, etc.

Terminal 120 may determine a set of thresholds for each FEC code with multiple code rates and may send the thresholds for all FEC codes as its capability to the system. The system may perform FEC code selection and determine a suitable FEC code to use for data transmission to terminal 120 based on the packet size and the thresholds for different FEC codes. The system may also perform code rate selection for a selected FEC code based on the packet size and the set of thresholds for that FEC code.

Although not shown in FIG. 6 for simplicity, one or more code rates may be supported for each type of FEC code. In one design, the system may support rate ⅕, rate ⅓, rate ½ and rate ⅔ for the Turbo code. Three thresholds may be defined between the first and second thresholds and used to select one of these four Turbo code rates. Alternatively or additionally, the system may support rate ⅕, rate ⅓, rate ½ and rate ⅔ for the LDPC code. Three thresholds may be defined above the second threshold and used to select one of these four LDPC code rates. The system may also support multiple code rates for the convolutional code, and one or more thresholds may be used to select one of the supported convolutional code rates.

If the thresholds for a given FEC code are determined based on the number of available HARQ interlaces (Q), then the same thresholds may be used regardless of the number of packets being sent in parallel. If the thresholds are determined based on the number of HARQ interlaces used for data transmission, then the thresholds may be computed based on the number of packets to send in parallel.

Figure 7:
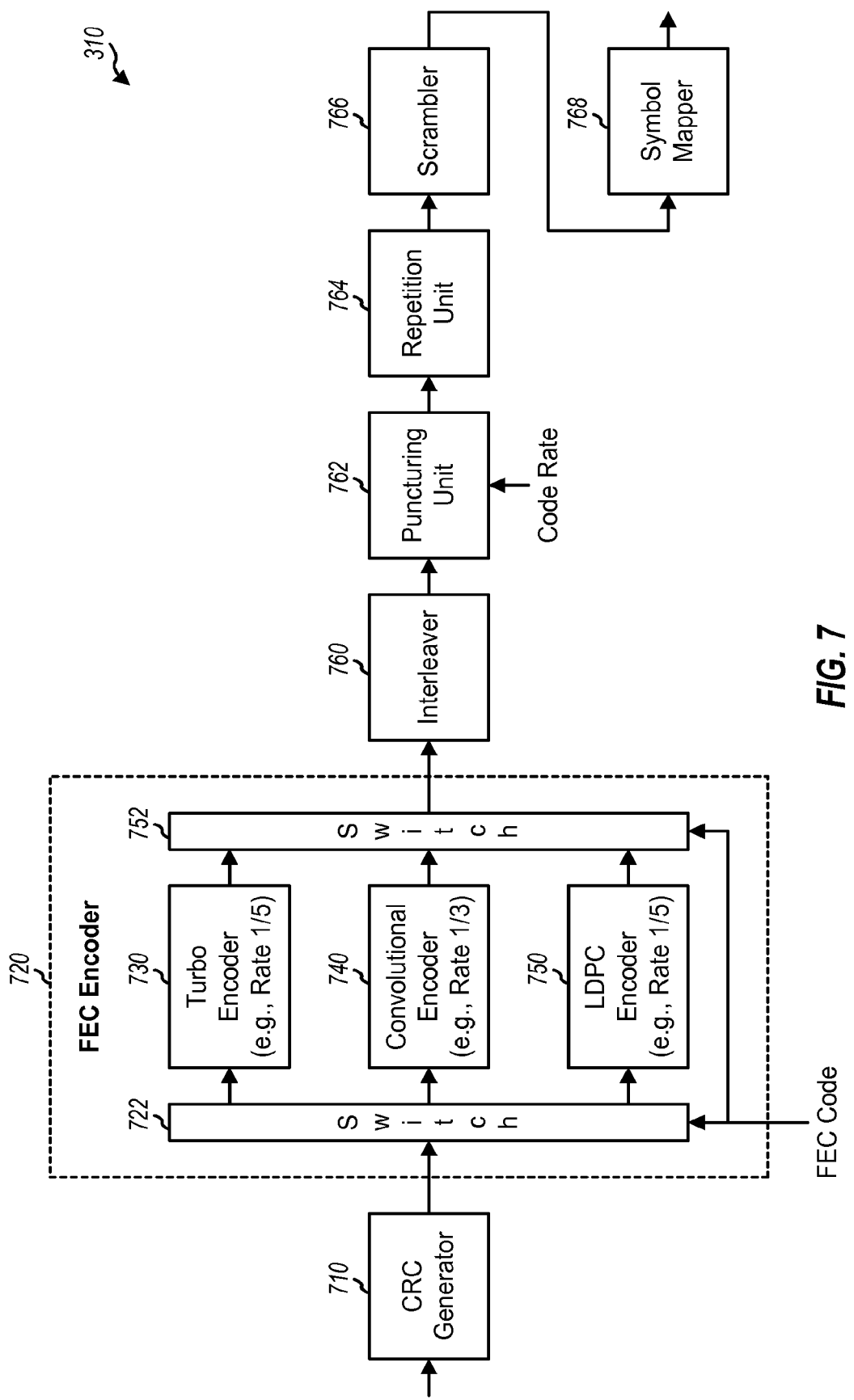
FIG. 7 shows a block diagram of a transmit (TX) data processor.

FIG. 7 shows a block diagram of a design of TX data processor 310, which may also be used for TX data processor 380 in FIG. 3. Within TX data processor 310, a cyclic redundancy check (CRC) generator 710 may receive a packet of data, generate a CRC for the packet, and provide a formatted packet having the CRC appended to the packet. The CRC may be used by a receiver to determine whether the packet is decoded correctly or in error.

An FEC encoder 720 may receive the formatted packet, encode the packet in accordance with an FEC code selected for the packet, and provide a coded packet. In the design shown in FIG. 7, FEC encoder 720 includes switches 722 and 752, a Turbo encoder 730, a convolutional encoder 740, and an LDPC encoder 750. Switch 722 may provide the formatted packet to Turbo encoder 730, convolutional encoder 740, or LDPC encoder 750 depending on the selected FEC code. Turbo encoder 730 may encode the formatted packet in accordance with a base code rate (e.g., rate ⅕) if the Turbo code is selected. Convolutional encoder 740 may encode the formatted packet in accordance with a base code rate (e.g., rate ⅓) if the convolutional code is selected. LDPC encoder 750 may encode the formatted packet in accordance with a base code rate (e.g., rate ⅕) if the LDPC code is selected. The base code rate for an FEC code is the lowest code rate for the FEC code. Depending on the selected FEC code, switch 752 may provide the code bits from Turbo encoder 730, convolutional encoder 740, or LDPC encoder 750 as the coded packet.

An interleaver 760 may interleave or reorder the code bits from FEC encoder 720 based on an interleaving scheme. In one design, interleaver 760 implements a pruned bit-reversal interleaver (PBRI) described in the aforementioned 3GPP2 C.S0084-001 document. The PBRI may be functionally equivalent to an approach where a coded packet is extended to a power of two by appending padding bits, the extended packet is interleaved in accordance with a bit-reversal interleaver, and a permuted packet is obtained by reading the permuted bits and removing the padding bits.

A puncturing unit 762 may receive all code bits for the packet from interleaver 760 and may puncture/discard zero or more code bits based on the selected code rate, as described below. Unit 762 may provide the proper number of code bits based on the selected code rate and the packet size. A repetition unit 764 may repeat the bits from unit 762, if necessary, to obtain the desired total number of bits. A scrambler 766 may scramble the bits from unit 764 to randomize the data. A scrambling sequence may be generated based on a linear feedback shift register (LFSR) implementing a particular generator polynomial. The LFSR may be initialized at the start of the packet with a seed value, which may be determined based on a MAC ID of terminal 120, a sector ID or pilot phase of a serving sector, a packet format index for the packet, a frame index of the first frame in which the packet is sent, and/or some other parameter. Scrambler 766 may perform exclusive OR (XOR) of the bits from unit 764 with the bits of the scrambling sequence to generate scrambled bits. A symbol mapper 768 may map the scrambled bits to modulation symbols based on a selected modulation scheme such as QPSK, 16-QAM, 64-QAM, etc.

FIG. 7 shows a specific design of TX data processor 310. A packet may also be processed in other manners. For example, the repetition and/or scrambling may be omitted or may be omitted for certain transmissions.

Figure 8:
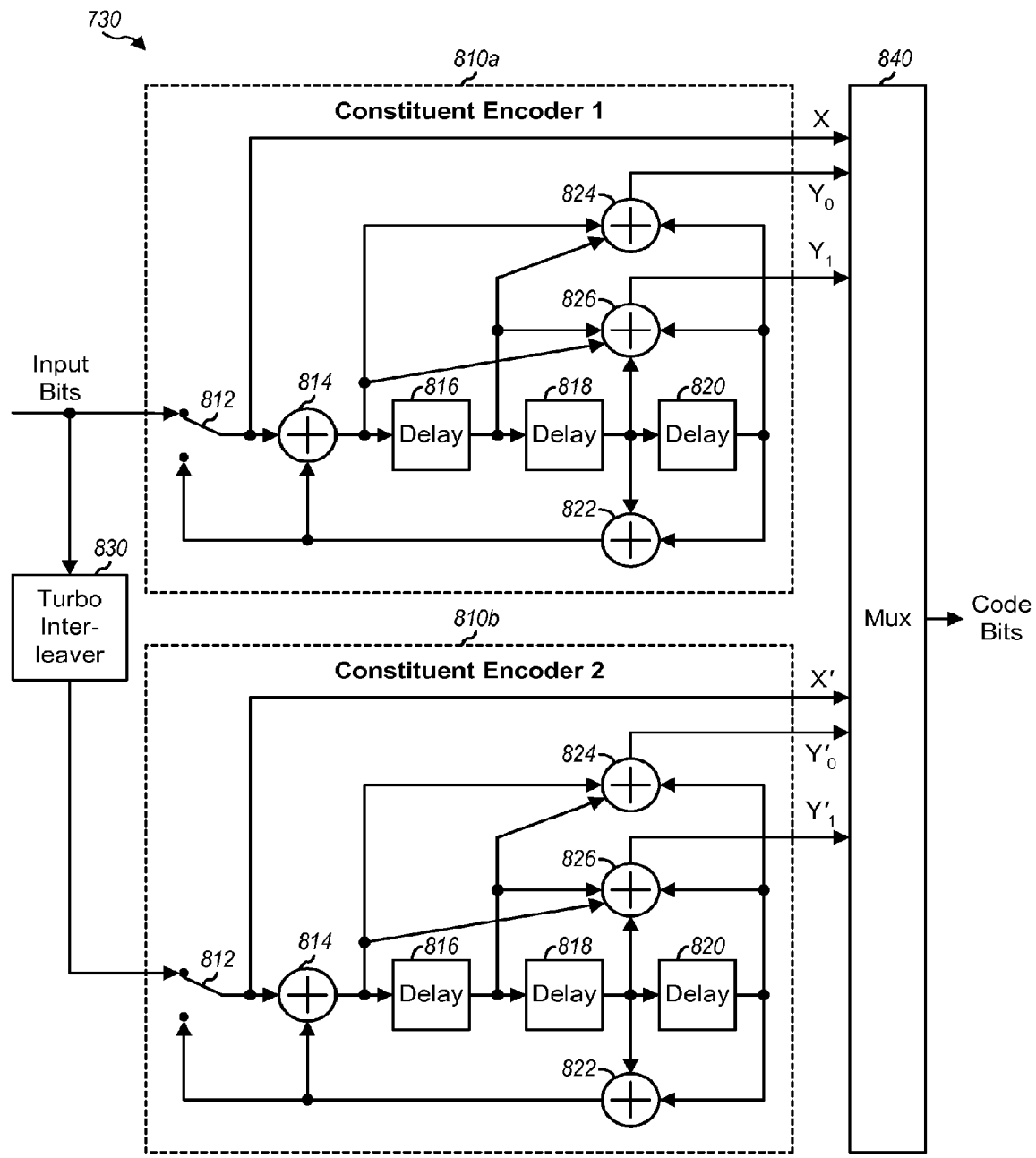
FIG. 8 shows a block diagram of a Turbo encoder.

FIG. 8 shows a block diagram of a design of Turbo encoder 730 in FIG. 7. In this design, Turbo encoder 730 implements a parallel concatenated convolutional code (PCCC) and includes two constituent encoders 810a and 810b, a Turbo interleaver 830, and a multiplexer (Mux) 840. Turbo encoder 730 encodes a packet of K information bits in accordance with a base code rate of ⅕ and provides a coded packet of about 5K code bits.

Within Turbo encoder 730, Turbo interleaver 830 interleaves the K information bits in the packet based on an interleaving scheme. Constituent encoder 810a receive an X sequence composed of the K information/input bits in the packet. Encoder 810a encodes the X sequence based on a first constituent code to obtain a $Y_0$ sequence of parity bits and based on a second constituent code to obtain a $Y_1$ sequence of parity bits. Similarly, constituent encoder 810b receives an X' sequence composed of K interleaved bits from Turbo interleaver 830. Encoder 810b encodes the X' sequence based on the first constituent code to obtain a $Y_0$' sequence of parity bits and based on the second constituent code to obtain a $Y_1$' sequence of parity bits.

Within each constituent encoder 810, a switch 812 first passes all K input bits (up position) and then passes the bits from an adder 822 (down position) for three clock cycles. An added 814 sums the bits from switch 812 with the bits from adder 822. Delay units 816, 818 and 820 are coupled in series, with delay unit 816 receiving the output of adder 814. Adder 822 sums the outputs of delay units 818 and 820 and provides its output to adder 814 and switch 812. An adder 824 sums the output of adder 814 and the outputs of delay units 816 and 820 and provides parity bits for the $Y_0$ or $Y_0$' sequence. An adder 826 sums the output of adder 814 and the outputs of delay units 816, 818 and 820 and provides parity bits for the $Y_1$ or $Y_1$' sequence. All adders are modulo-2 adders. Constituent encoder 810a provides 3K+9 code bits composed of the X sequence of K systematic bits, the $Y_0$ sequence of K parity bits, the $Y_1$ sequence of K parity bits, and 9 tail bits. Similarly, constituent encoder 810b provides 3K+9 code bits composed of the X' sequence of K systematic bits, the $Y_0$ sequence of K parity bits, the $Y_1$' sequence of K parity bits, and 9 tail bits.

Multiplexer 840 receives the 6K+18 code bits from constituent encoders 810a and 810b and provides 5K+18 code bits in five sequences U, $V_0$, $V_1$, $V_0$', and $V_1$'. The U sequence contains the K systematic bits in the X sequence plus 6 tail bits from switch 812 in both constituent encoders 810a and 810b. The $V_0$ sequence contains the K parity bits in the $Y_0$ sequence plus 3 tail bits from adder 824 in constituent encoder 810a. The $V_1$ sequence contains the K parity bits in the $Y_1$ sequence plus 3 tail bits from adder 826 in constituent encoder 810a. The $V_0$' sequence contains the K parity bits in the $Y_0$' sequence plus 3 tail bits from adder 824 in constituent encoder 810b. The $V_1$' sequence contains the K parity bits in the $Y_1$' sequence plus 3 tail bits from adder 826 in constituent encoder 810b.

Referring back to FIG. 7, in one design, interleaver 760 may interleave the U sequence and provide a permuted U sequence. Interleaver 760 may also interleave the $V_0$' sequence to obtain an $A_0$ sequence, interleave the $V_0$' sequence to obtain a $B_0$ sequence, and provide a permuted $V_0/V_0$' sequence composed of alternate bits from the $A_0$ and $B_0$ sequences. Interleaver 760 may also interleave the $V_1$ sequence to obtain an $A_1$ sequence, interleave the $V_1$' sequence to obtain a $B_1$ sequence, and provide a permuted $V_1/V_1$' sequence composed of alternate bits from the $A_1$ and $B_1$ sequences.

Puncturing unit 762 may receive the three permuted sequences from interleaver 760 and provide a sufficient number of code bits based on the selected code rate. If Turbo code rate ⅕ is selected, then unit 762 may provide the permuted U sequence, followed by the permuted $V_0/V_0$' sequence, followed by the permuted $V_1/V_1$' sequence. If Turbo code rate ⅓ is selected, then unit 762 may provide the permuted U sequence followed by the permuted $V_0/V_0$' sequence. The permuted $V_1/V_1$' sequence may be discarded. If Turbo code rate ½ is selected, then unit 762 may provide the permuted U sequence followed by the first K+3 bits of the permuted $V_0/V_0$' sequence. The remaining bits may be discarded. If Turbo code rate ⅔ is selected, then unit 762 may provide the permuted U sequence followed by the first $\lfloor(K+3)/2\rfloor$ bits of the permuted $V_0/V_0$' sequence. The remaining bits may be discarded.

In the design shown in FIGS. 7 and 8, a rate ⅕ Turbo code is used as the base code rate, and other code rates ⅓, ½ and ⅔ are obtained by puncturing some of the code bits. This Turbo code design may allow a single Turbo decoder to support all of the Turbo code rates. Multiple Turbo code rates may also be supported with other designs, e.g., with different Turbo codes.

Figure 9:
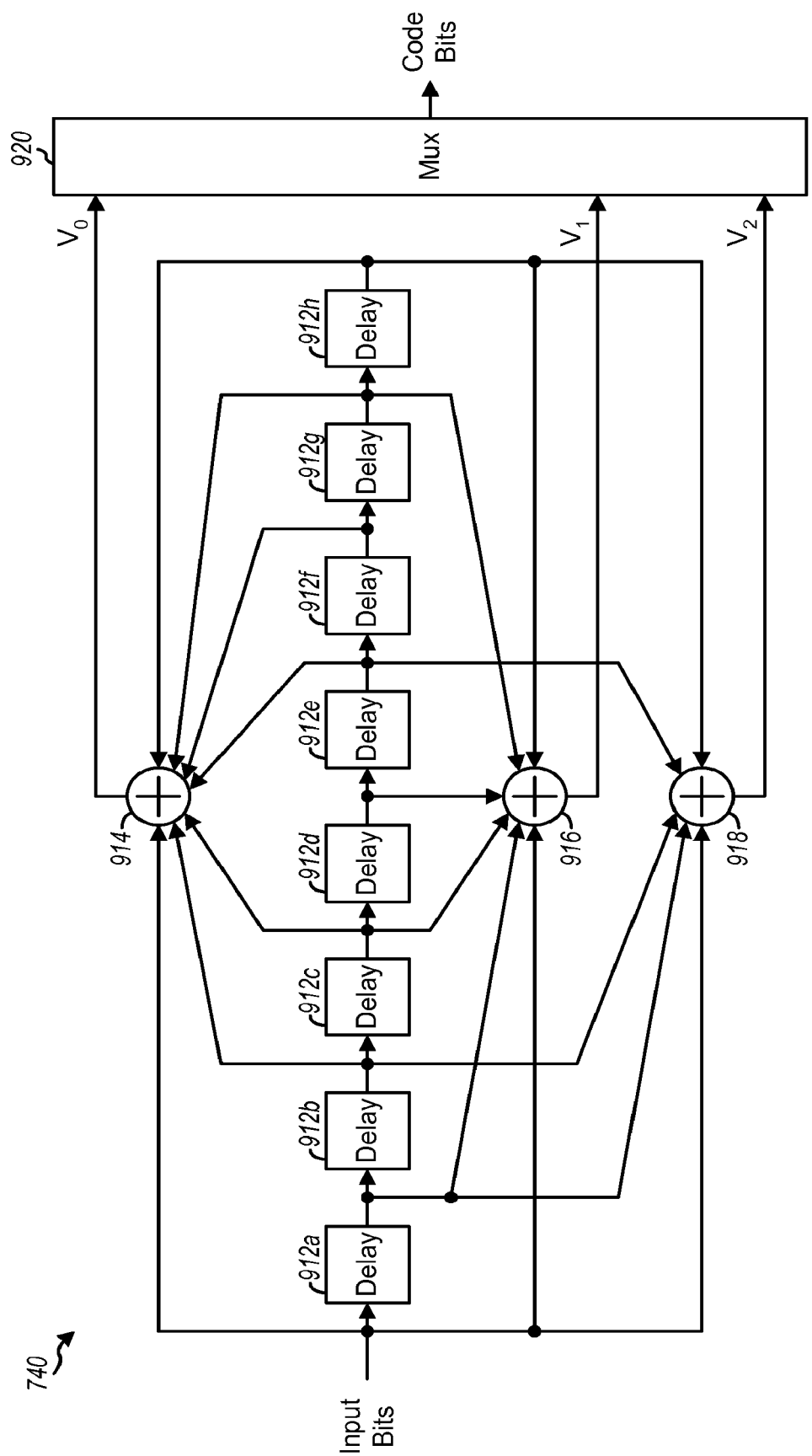
FIG. 9 shows a block diagram of a convolutional encoder.

FIG. 9 shows a block diagram of a design of convolutional encoder 740 in FIG. 7. In this design, convolutional encoder 740 implements a rate ⅓ convolutional code of constraint length 9. Within convolutional encoder 740, eight delay units 912a through 912h are coupled in series, with delay unit 912a receiving the information/input bits of a packet. An adder 914 sums the input of delay unit 912a and the outputs of delay units 912b, 912c, 912e, 912f, 912g and 912h and provides a $V_0$ sequence of code bits. An adder 916 sums the input of delay unit 912a and the outputs of delay units 912a, 912c, 912d, 912g and 912h and provides a $V_1$ sequence of code bits. An adder 918 sums the input of delay unit 912a and the outputs of delay units 912a, 912b, 912e and 912h and provides a $V_2$ sequence of code bits. A multiplexer 920 multiplexes the $V_0$, $V_1$ and $V_2$ sequences and provides a coded packet of about 3K code bits.

Referring back to FIG. 7, in one design, interleaver 760 may receive the $V_0$, $V_1$ and $V_2$ sequences from convolutional encoder 740 and provide a permuted $V_0/V_1/V_2$ sequence. Interleaver 760 may interleave the $V_0$ sequence to obtain an A sequence, interleave the $V_1$ sequence to obtain a B sequence, and interleave the $V_2$ sequence to obtain a C sequence. Interleaver 760 may then provide the A sequence, followed by the B sequence, followed by the C sequence as the permuted $V_0/V_1/V_2$ sequence. Multiple code rates may be supported for the convolutional code by encoding in accordance with the base code rate and puncturing to obtain higher code rates. Multiple code rates may also be supported with different convolutional codes.

LDPC encoder 750 may be implemented as described in the aforementioned 3GPP2 C.S0084-001 document or in other manners known in the art. Multiple code rates may be supported for the LDPC code, e.g., as described in the aforementioned 3GPP2 C.S0084-001 document.

Figure 10:
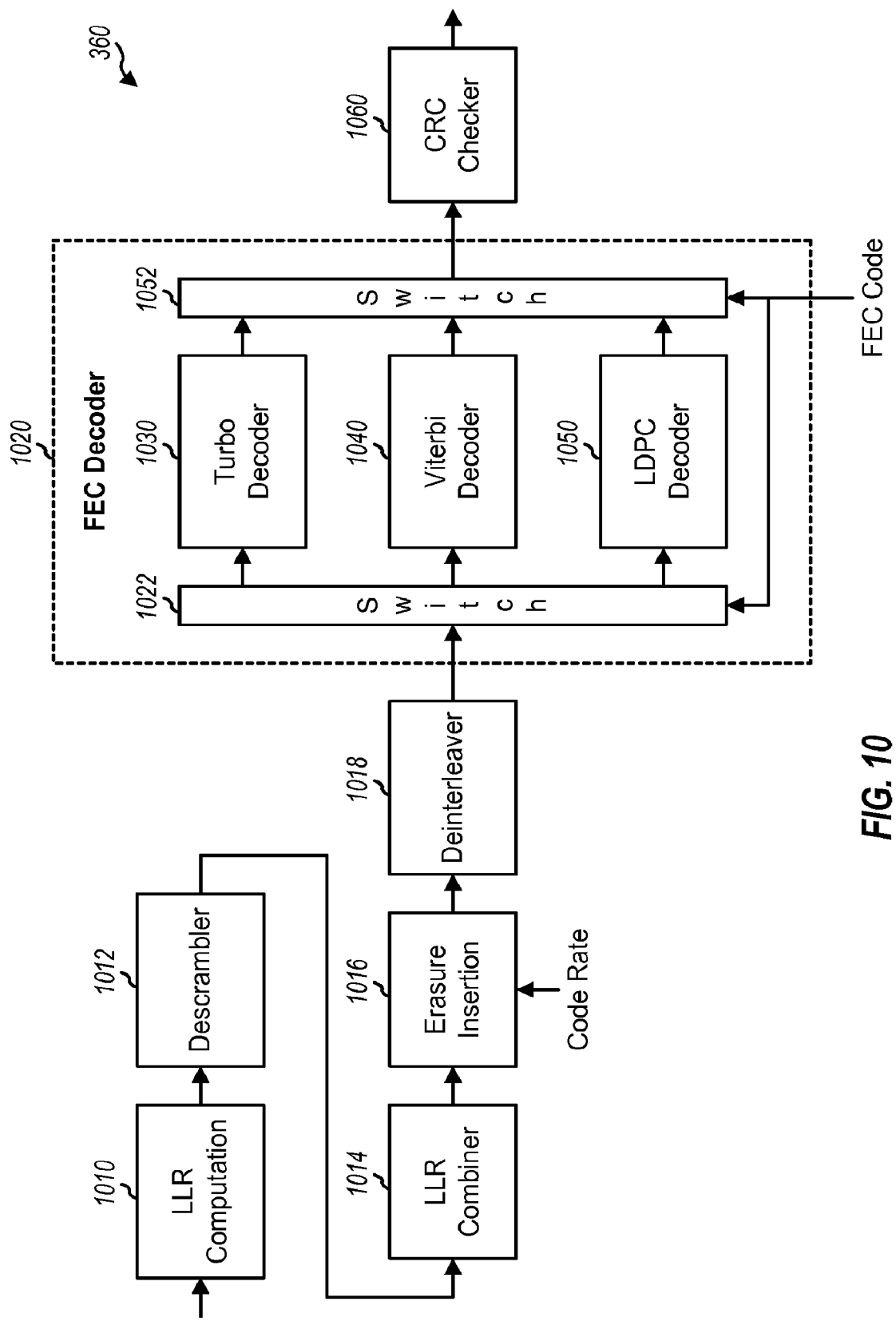
FIG. 10 shows a block diagram of a receive (RX) data processor.

FIG. 10 shows a block diagram of a design of RX data processor 360, which may also be used for RX data processor 340 in FIG. 3. Within RX data processor 360, an LLR computation unit 1010 may receive the detected symbols from MIMO detector 356 and may compute LLRs for code bits received for a packet based on the detected symbols. A descrambler 1012 may descramble the LLRs based on the scrambling sequence used by the transmitter. An LLR combiner 1014 may combine LLRs for repeated code bits, e.g., sent in later HARQ transmissions. An erasure insertion unit 1016 may insert erasures for code bits not received for the packet. An erasure may be an LLR of 0, which may indicate equal likelihood of a code bit being '0' or '1'. The code bits not received may include code bits discarded by puncturing unit 762 in FIG. 7 as well as code bits not yet transmitted. A deinterleaver 1018 may deinterleave the LLRs from unit 1016 in a manner complementary to the interleaving by interleaver 760 in FIG. 7.

An FEC decoder 1020 may receive the LLRs for the packet, decode the LLRs in accordance with an FEC code selected for the packet, and provide a decoded packet. In the design shown in FIG. 10, FEC decoder 1020 includes switches 1022 and 1052, a Turbo decoder 1030, a Viterbi decoder 1040, and an LDPC decoder 1050. Switch 1022 may provide the LLRs to Turbo decoder 1030, Viterbi decoder 1040, or LDPC decoder 1050 depending on the selected FEC code. Turbo decoder 1030 may decode the LLRs if the Turbo code is selected. Viterbi decoder 1040 may decode the LLRs if the convolutional code is selected. LDPC decoder 1050 may decode the LLRs if the LDPC code is selected. Depending on the selected FEC code, switch 1052 may provide the decoded bits from Turbo decoder 1030, Viterbi decoder 1040, or LDPC decoder 1050 as the decoded packet. A CRC checker 1060 may check the decoded packet and provide decoding status for the packet.

Figures 11, 12:
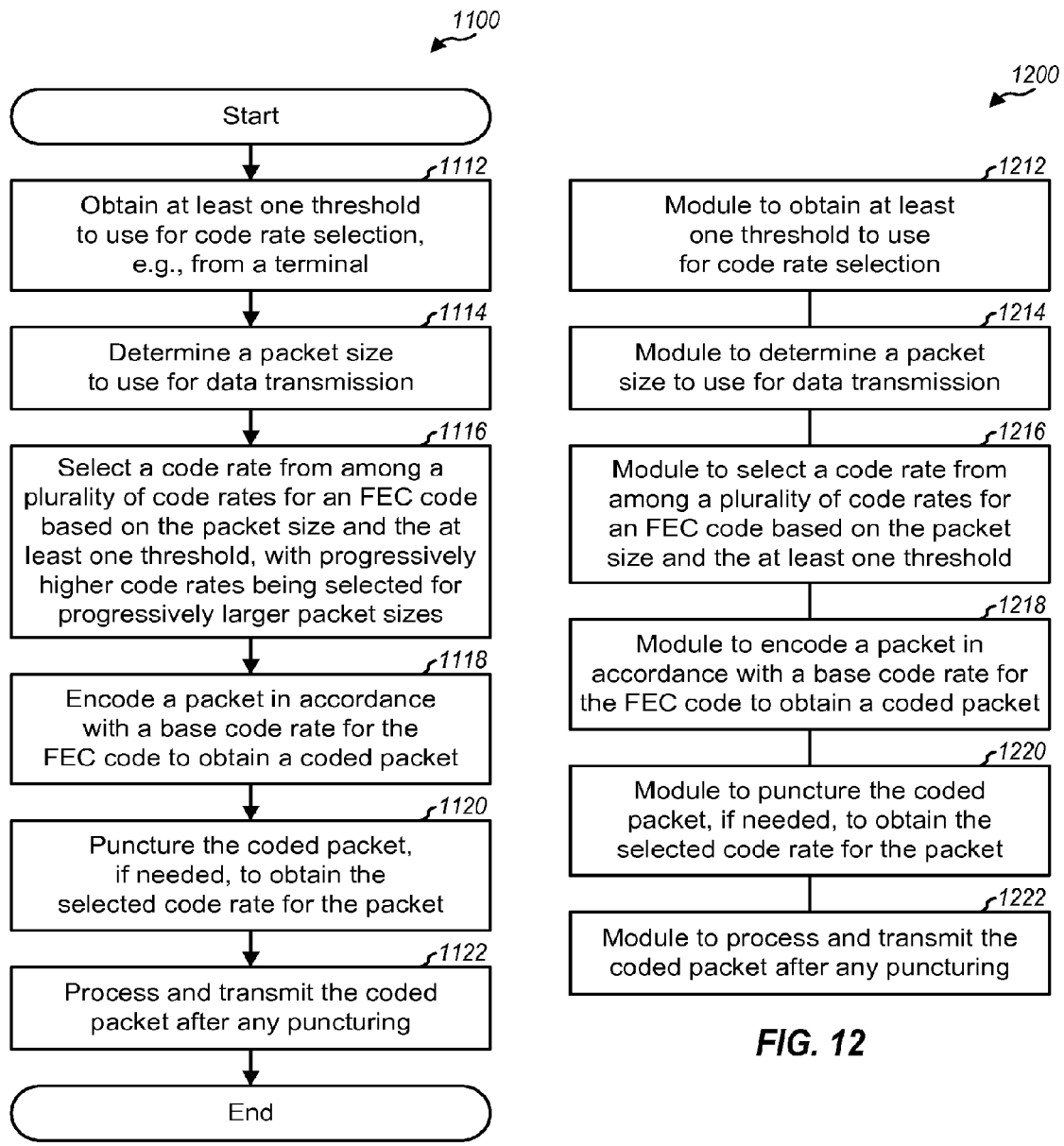
FIGS. 11 and 12 show a process and an apparatus, respectively, for transmitting data with code rate selection based on packet size.

FIG. 11 shows a design of a process 1100 for transmitting data with code rate selection based on packet size. At least one threshold to use for code rate selection may be obtained, e.g., received from a terminal or computed based on capability information (e.g., memory size) received from the terminal (block 1112). A packet size to use for data transmission may be determined, e.g., as shown in equation (1) (block 1114). A code rate may be selected from among a plurality of code rates for an FEC code based on the packet size and the at least one threshold, with progressively higher code rates being selected for progressively larger packet sizes (block 1116). The FEC code may comprise a Turbo code, an LDPC code, a convolutional code, or some other code. A packet may be encoded in accordance with a base code rate for the FEC code to obtain a coded packet (block 1118). The coded packet may be punctured, if needed, to obtain the selected code rate for the packet (block 1120). The coded packet, after any puncturing, may be further processed and transmitted (block 1122).

For block 1116, the packet size may be compared against the at least one threshold, and the code rate may be selected from among the plurality of code rates based on the result of the comparison. In one design, the plurality of code rates may include code rate ⅕, code rate ⅓, code rate ½, and code rate ⅔. Code rate ⅕ may be selected if the packet size is less than or equal to a first threshold. Code rate ⅓ may be selected if the packet size is greater than the first threshold and less than or equal to a second threshold. Code rate ½ may be selected if the packet size is greater than the second threshold and less than or equal to a third threshold. Code rate ⅔ may be selected if the packet size is greater than the third threshold.

FIG. 12 shows a design of an apparatus 1200 for transmitting data with code rate selection based on packet size. Apparatus 1200 includes means for obtaining at least one threshold to use for code rate selection (module 1212), means for determining a packet size to use for data transmission (module 1214), means for selecting a code rate from among a plurality of code rates for an FEC code based on the packet size and the at least one threshold (module 1216), means for encoding a packet in accordance with a base code rate for the FEC code to obtain a coded packet (module 1218), means for puncturing the coded packet, if needed, to obtain the selected code rate for the packet (module 1220), and means for processing and transmitting the coded packet after any puncturing (module 1222).

FIG. 13 shows a design of a process 1300 for receiving data with code rate selection based on packet size. At least one threshold to use for code rate selection may be determined, e.g., based on memory size, the number of HARQ interlaces available for data transmission, the number of packets to receive in parallel, etc. (block 1312). The at least one threshold may be sent to a transmitter, e.g., a base station (block 1314). Alternatively, capability information (e.g., the memory size) may be sent to the transmitter, and the transmitter may determine the at least one threshold based on the capability information.

A packet encoded in accordance with a selected code rate for an FEC code may be received (block 1316). The FEC code may comprise a Turbo code, an LDPC code, a convolutional code, or some other code. The code rate may be selected from among a plurality of code rates for the FEC code based on a packet size of the packet and the at least one threshold. The packet may be decoded in accordance with the selected code rate for the FEC code (block 1318). For block 1318, LLRs may be computed for code bits received for the packet. Erasures may be inserted for code bits not received for the packet, e.g., code bits punctured or not yet transmitted. The packet may be decoded based on the LLRs for the received code bits and the erasures for the code bits not received.

FIG. 14 shows a design of an apparatus 1400 for receiving data with code rate selection based on packet size. Apparatus 1400 includes means for determining at least one threshold to use for code rate selection (module 1412), means for sending the at least one threshold to a transmitter (module 1414), means for receiving a packet encoded in accordance with a selected code rate for an FEC code, with the code rate being selected from among a plurality of code rates for the FEC code based on a packet size of the packet and the at least one threshold (module 1416), and means for decoding the packet in accordance with the selected code rate for the FEC code (module 1418).

Figure 15:
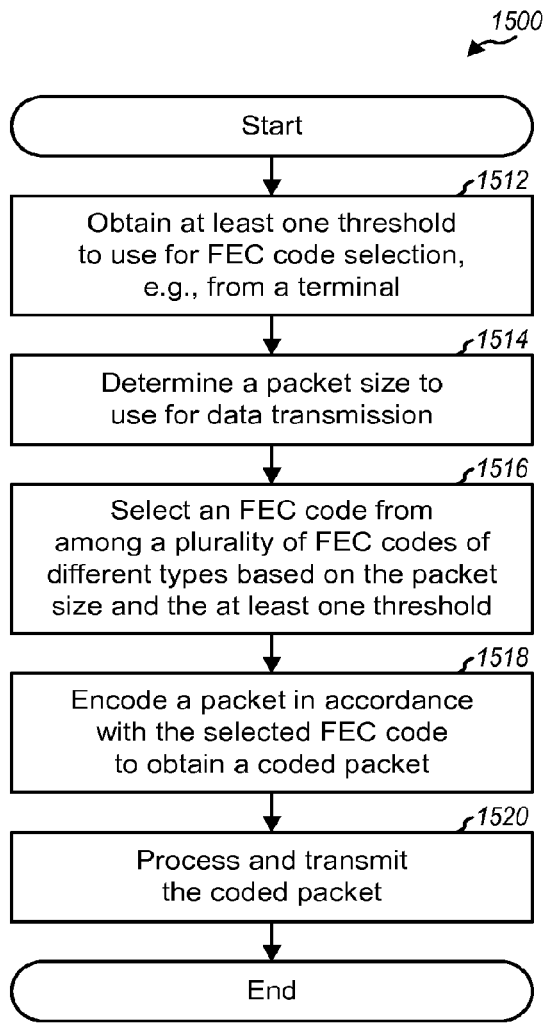
FIGS. 15 and 16 show a process and an apparatus, respectively, for transmitting data with FEC code selection based on packet size.

FIG. 15 shows a design of a process 1500 for transmitting data with FEC code selection based on packet size. At least one threshold to use for FEC code selection may be obtained, e.g., received from a terminal or computed based on capability information (e.g., memory size) received from the terminal (block 1512). A packet size to use for data transmission may be determined, e.g., as shown in equation (1) (block 1514). An FEC code may be selected from among a plurality of FEC codes of different types based on the packet size and the at least one threshold (block 1516). A packet may be encoded in accordance with the selected FEC code to obtain a coded packet (block 1518). The coded packet may be processed and transmitted (block 1520).

For block 1516, the packet size may be compared against the at least one threshold, and the FEC code may be selected from among the plurality of FEC codes based on the result of the comparison. In one design, the plurality of FEC codes may include a Turbo code, an LDPC code, and a convolutional code. The convolutional code may be selected if the packet size is less than or equal to a first threshold. The Turbo code may be selected if the packet size is greater than the first threshold and less than or equal to a second threshold. The LDPC code may be selected if the packet size is greater than the second threshold.

Figure 16:
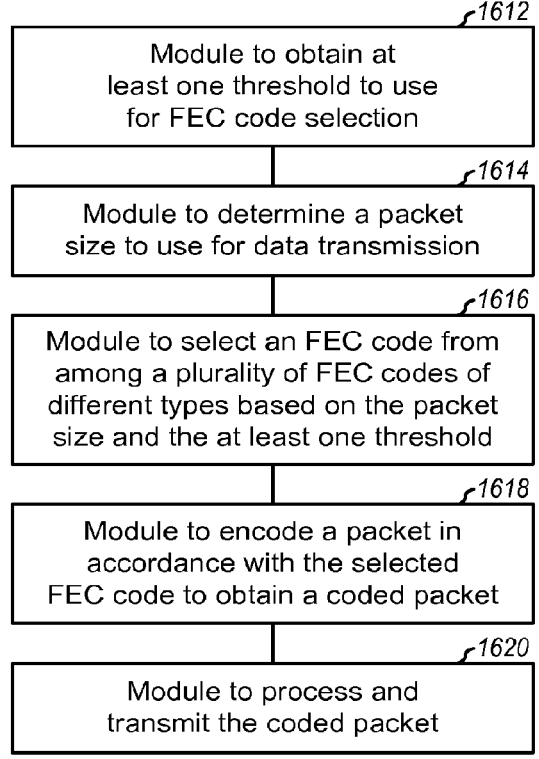

FIG. 16 shows a design of an apparatus 1600 for transmitting data with FEC code selection based on packet size. Apparatus 1600 includes means for obtaining at least one threshold to use for FEC code selection (module 1612), means for determining a packet size to use for data transmission (module 1614), means for selecting an FEC code from among a plurality of FEC codes of different types based on the packet size and the at least one threshold (module 1616), means for encoding a packet in accordance with the selected FEC code to obtain a coded packet (module 1618), and means for processing and transmitting the coded packet (module 1620).

FIG. 17 shows a design of a process 1700 for receiving data with FEC code selection based on packet size. At least one threshold to use for FEC code selection may be determined, e.g., based on memory size, the number of HARQ interlaces available for data transmission, the number of packets to receive in parallel, etc. (block 1712). The at least one threshold may be sent to a transmitter, e.g., a base station (block 1714). Alternatively, capability information (e.g., the memory size) may be sent to the transmitter and used by the transmitter to determine the at least one threshold.

A packet encoded in accordance with a selected FEC code may be received (block 1716). The FEC code may be selected from among a plurality of FEC codes of different types based on a packet size of the packet and the at least one threshold. The plurality of FEC codes may include a Turbo code, an LDPC code, a convolutional code, etc. The packet may be decoded in accordance with the selected FEC code (block 1718). For block 1718, LLRs may be computed for code bits received for the packet. Erasures may be inserted for code bits not received for the packet, e.g., code bits punctured or not yet transmitted. The packet may be decoded based on the LLRs for the received code bits and the erasures for the code bits not received.

FIG. 18 shows a design of an apparatus 1800 for receiving data with FEC code rate selection based on packet size. Apparatus 1800 includes means for determining at least one threshold to use for FEC code selection (module 1812), means for sending the at least one threshold to a transmitter (module 1814), means for receiving a packet encoded in accordance with a selected FEC code, with the FEC code being selected from among a plurality of FEC codes of different types based on a packet size of the packet and the at least one threshold (module 1816), and means for decoding the packet in accordance with the selected FEC code (module 1818).

The modules in FIGS. 12, 14, 16 and 18 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units used to perform techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 332 or 372 in FIG. 3) and executed by a processor (e.g., processor 330 or 370). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for communication, comprising:
at least one processor configured to determine a packet size to use for data transmission, and to select a code rate from among a plurality of code rates for a forward error correction (FEC) code based on the packet size, with progressively higher code rates being selected for progressively larger packet sizes; and
a memory coupled to the at least one processor;
wherein the at least one processor is configured to select the code rate by selecting a convolutional code if the packet size is less than or equal to a first threshold, and selecting a Turbo code if the packet size is greater than the first threshold and less than or equal to a second threshold.

2. The apparatus of claim 1, wherein the at least one processor is configured to compare the packet size against at least one of the first threshold and the second threshold and to select the code rate from among the plurality of code rates based on result of the comparison.

3. The apparatus of claim 2, wherein the at least one processor is configured to receive the first threshold and second threshold from a terminal and to select the code rate for data transmission to the terminal based on the packet size and the first threshold and second threshold.

4. The apparatus of claim 2, wherein the at least one processor is configured to receive capability information from a terminal, to determine the first threshold and second threshold based on the capability information, and to select the code rate for data transmission to the terminal based on the packet size and the first threshold and second threshold.

5. The apparatus of claim 1, wherein the plurality of code rates comprise code rate 1/5, code rate 1/3, and code rate 1/2.

6. The apparatus of claim 5, wherein the at least one processor is configured to select code rate 1/5 if the packet size is less than or equal to the first threshold, to select code rate 1/3 if the packet size is greater than the first threshold and less than or equal to the second threshold, and to select code rate 1/2 if the packet size is greater than the second threshold and less than or equal to a third threshold.

7. The apparatus of claim 6, wherein the plurality of code rates further comprise code rate 2/3, and wherein the at least one processor is configured to select code rate 2/3 if the packet size is greater than the third threshold.

8. The apparatus of claim 1, wherein the at least one processor is configured to encode a packet in accordance with a base code rate for the FEC code to obtain a coded packet, and to puncture the coded packet, if needed, to obtain the selected code rate for the packet.

9. The apparatus of claim 1, wherein the FEC code comprises a low density parity check (LDPC) code.

10. A method for communication executed by a processor device, comprising:
determining a packet size to use for data transmission; and
selecting a code rate from among a plurality of code rates for a forward error correction (FEC) code based on the packet size, with progressively higher code rates being selected for progressively larger packet sizes;
wherein selecting the code rate comprises selecting a convolutional code if the packet size is less than or equal to a first threshold, and selecting a Turbo code if the packet size is greater than the first threshold and less than or equal to a second threshold.

11. The method of claim 10, further comprising:
receiving the first threshold and the second threshold from a terminal, and wherein the selecting the code rate comprises selecting the code rate for data transmission to the terminal based on the packet size and the first threshold and the second threshold.

12. The method of claim 10, wherein the plurality of code rates comprise code rate 1/5, code rate 1/3, and code rate 1/2, and wherein the selecting the code rate comprises
selecting code rate 1/5 if the packet size is less than or equal to the first threshold,
selecting code rate 1/3 if the packet size is greater than the first threshold and less than or equal to the second threshold, and
selecting code rate 1/2 if the packet size is greater than the second threshold and less than or equal to a third threshold.

13. The method of claim 12, wherein the plurality of code rates further comprise code rate 2/3, and wherein the selecting the code rate further comprises selecting code rate 2/3 if the packet size is greater than the third threshold.

14. The method of claim 10, further comprising:
encoding a packet in accordance with a base code rate for the FEC code to obtain a coded packet; and
puncturing the coded packet, if needed, to obtain the selected code rate for the packet.

15. An apparatus for communication, comprising:
means for determining a packet size to use for data transmission; and
means for selecting a code rate from among a plurality of code rates for a forward error correction (FEC) code based on the packet size, with progressively higher code rates being selected for progressively larger packet sizes;
wherein the means for selecting the code rate comprise means for selecting a convolutional code if the packet size is less than or equal to a first threshold, and selecting a Turbo code if the packet size is greater than the first threshold and less than or equal to a second threshold.

16. The apparatus of claim 15, further comprising:
means for receiving the first threshold and the second threshold from a terminal, and wherein the means for selecting the code rate comprises means for selecting the code rate for data transmission to the terminal based on the packet size and the first threshold and the second threshold.

17. The apparatus of claim 15, wherein the plurality of code rates comprise code rate 1/5, code rate 1/3, and code rate 1/2, and wherein the means for selecting the code rate comprise:
means for selecting code rate 1/5 if the packet size is less than or equal to the first threshold,
means for selecting code rate 1/3 if the packet size is greater than the first threshold and less than or equal to the second threshold, and
means for selecting code rate 1/2 if the packet size is greater than the second threshold and less than or equal to a third threshold.

18. The apparatus of claim 17, wherein the plurality of code rates further comprise code rate 2/3, and wherein the means for selecting the code rate further comprises means for selecting code rate 2/3 if the packet size is greater than the third threshold.

19. The apparatus of claim 15, further comprising:
means for encoding a packet in accordance with a base code rate for the FEC code to obtain a coded packet; and
means for puncturing the coded packet, if needed, to obtain the selected code rate for the packet.

20. A computer device, comprising: a computer-readable medium comprising:
code for causing at least one computer to determine a packet size to use for data transmission; and
code for causing the at least one computer to select a code rate from among a plurality of code rates for a forward error correction (FEC) code based on the packet size, with progressively higher code rates being selected for progressively larger packet sizes;
wherein the code for causing the at least one computer to select a code rate comprises code for selecting a convolutional code if the packet size is less than or equal to a first threshold, and selecting a Turbo code if the packet size is greater than the first threshold and less than or equal to a second threshold.

21. An apparatus for communication, comprising:
at least one processor configured to receive a packet encoded in accordance with a selected code rate for a forward error correction (FEC) code, the code rate being selected from among a plurality of code rates for the FEC code based on a packet size of the packet, and to decode the packet in accordance with the selected code rate for the FEC code; and a memory coupled to the at least one processor and configured to store the packet wherein the packet is encoded in accordance with a convolutional code if the packet size is less than or equal to a first threshold, and the packet is encoded in accordance with a Turbo code if the packet size is greater than the first threshold and less than or equal to a second threshold.

22. The apparatus of claim 21, wherein the at least one processor is configured to determine the first threshold and the second threshold for code rate selection and to send the first threshold and the second threshold to a base station, and wherein the code rate for the packet is selected based further on the first threshold and the second threshold.

23. The apparatus of claim 22, wherein the at least one processor is configured to determine the first threshold and the second threshold based on a size of the memory.

24. The apparatus of claim 22, wherein the at least one processor is configured to determine the first threshold and the second threshold based on number of hybrid automatic retransmission (HARQ) interlaces available for data transmission.

25. The apparatus of claim 22, wherein the at least one processor is configured to determine the first threshold and the second threshold based on number of packets to receive in parallel.

26. The apparatus of claim 21, wherein the at least one processor is configured to send capability information to a base station, and wherein the code rate for the packet is selected based further on at least one threshold determined based on the capability information.

27. The apparatus of claim 21, wherein the at least one processor is configured to compute log-likelihood ratios (LLRs) for code bits received for the packet and to store the LLRs in the memory.

28. The apparatus of claim 27, wherein the at least one processor is configured to insert erasures for code bits not received for the packet and to decode the packet based on the LLRs for the received code bits and the erasures for the code bits not received.

29. A method for communication executed by a processor device, comprising:
receiving a packet encoded in accordance with a selected code rate for a forward error correction (FEC) code, the code rate being selected from among a plurality of code rates for the FEC code based on a packet size of the packet; and
decoding the packet in accordance with the selected code rate for the FEC code;
wherein decoding the packet is in accordance with a convolutional code if the packet size is less than or equal to a first threshold, and decoding the packet is in accordance with a Turbo code if the packet size is greater than the first threshold and less than or equal to a second threshold.

30. The method of claim 29, further comprising:
determining the first threshold and the second threshold to use for code rate selection; and
sending the first threshold and the second threshold to a base station, wherein the code rate for the packet is selected based further on the first threshold and the second threshold.

31. The method of claim 29, wherein the decoding the packet comprises:
computing log-likelihood ratios (LLRs) for code bits received for the packet,
inserting erasures for code bits not received for the packet, and
decoding the packet based on the LLRs for the received code bits and the erasures for the code bits not received.

32. An apparatus for communication, comprising:
means for receiving a packet encoded in accordance with a selected code rate for a forward error correction (FEC) code, the code rate being selected from among a plurality of code rates for the FEC code based on a packet size of the packet; and
means for decoding the packet in accordance with the selected code rate for the FEC code;
wherein the means for decoding the packet operates in accordance with a convolutional code if the packet size is less than or equal to a first threshold, and in accordance with a Turbo code if the packet size is greater than the first threshold and less than or equal to a second threshold.

33. The apparatus of claim 32, further comprising:
means for determining the first threshold and the second threshold to use for code rate selection; and
means for sending the first threshold and the second threshold to a base station, wherein the code rate for the packet is selected based further on the first threshold and the second threshold.

34. The apparatus of claim 32, wherein the means for decoding the packet comprises:
means for computing log-likelihood ratios (LLRs) for code bits received for the packet,
means for inserting erasures for code bits not received for the packet, and
means for decoding the packet based on the LLRs for the received code bits and the erasures for the code bits not received.

35. A computer device, comprising:
a computer-readable medium comprising:
code for causing at least one computer to receive a packet encoded in accordance with a selected code rate for a forward error correction (FEC) code, the code rate being selected from among a plurality of code rates for the FEC code based on a packet size of the packet; and
code for causing the at least one computer to decode the packet in accordance with the selected code rate for the FEC code;
wherein the code for causing the at least one computer to decode the packet comprises code for decoding the packet is in accordance with a convolutional code if the packet size is less than or equal to a first threshold, and decoding the packet is in accordance with a Turbo code if the packet size is greater than the first threshold and less than or equal to a second threshold.

* * * * *